June 10, 1958     W. J. FRANCIS     2,838,419
NON-SOLVENT ANTI-CORROSIVE SHIPBOTTOM COMPOSITION
Filed April 6, 1954     2 Sheets-Sheet 1
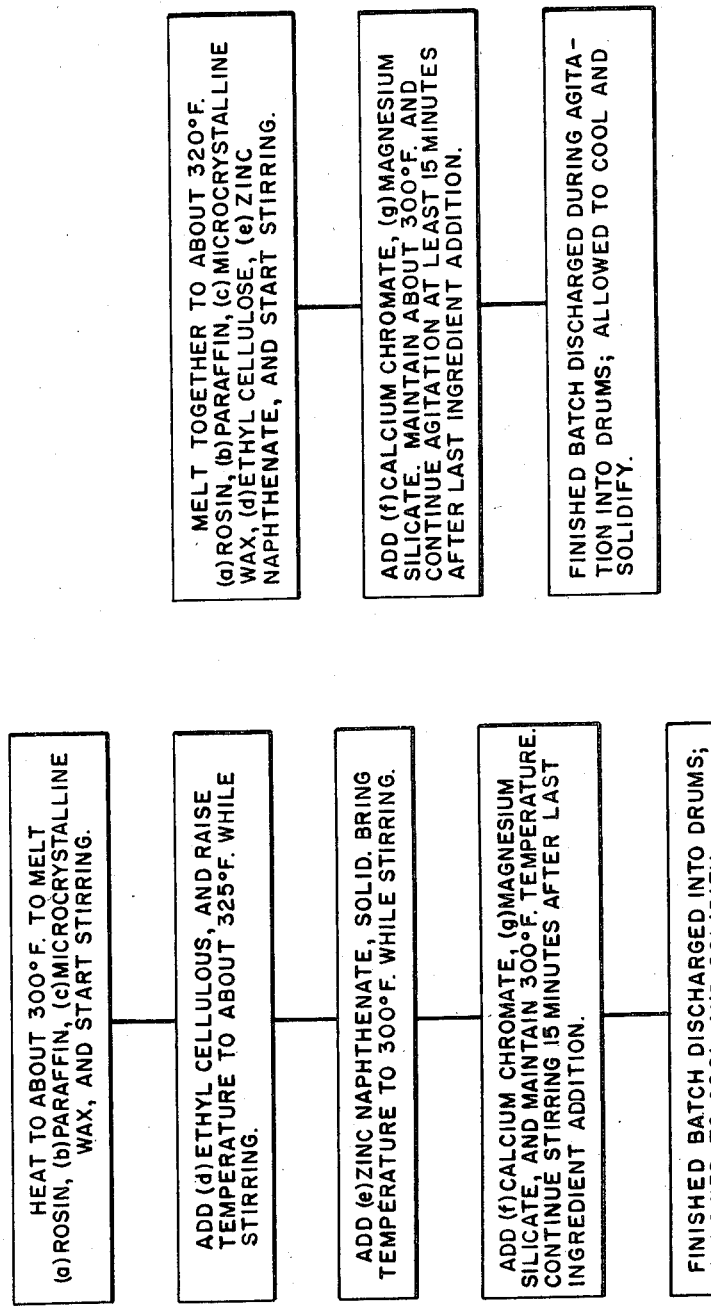
INVENTOR.
WILLIAM J. FRANCIS
BY
B. L. Zangwill
ATTORNEYS.

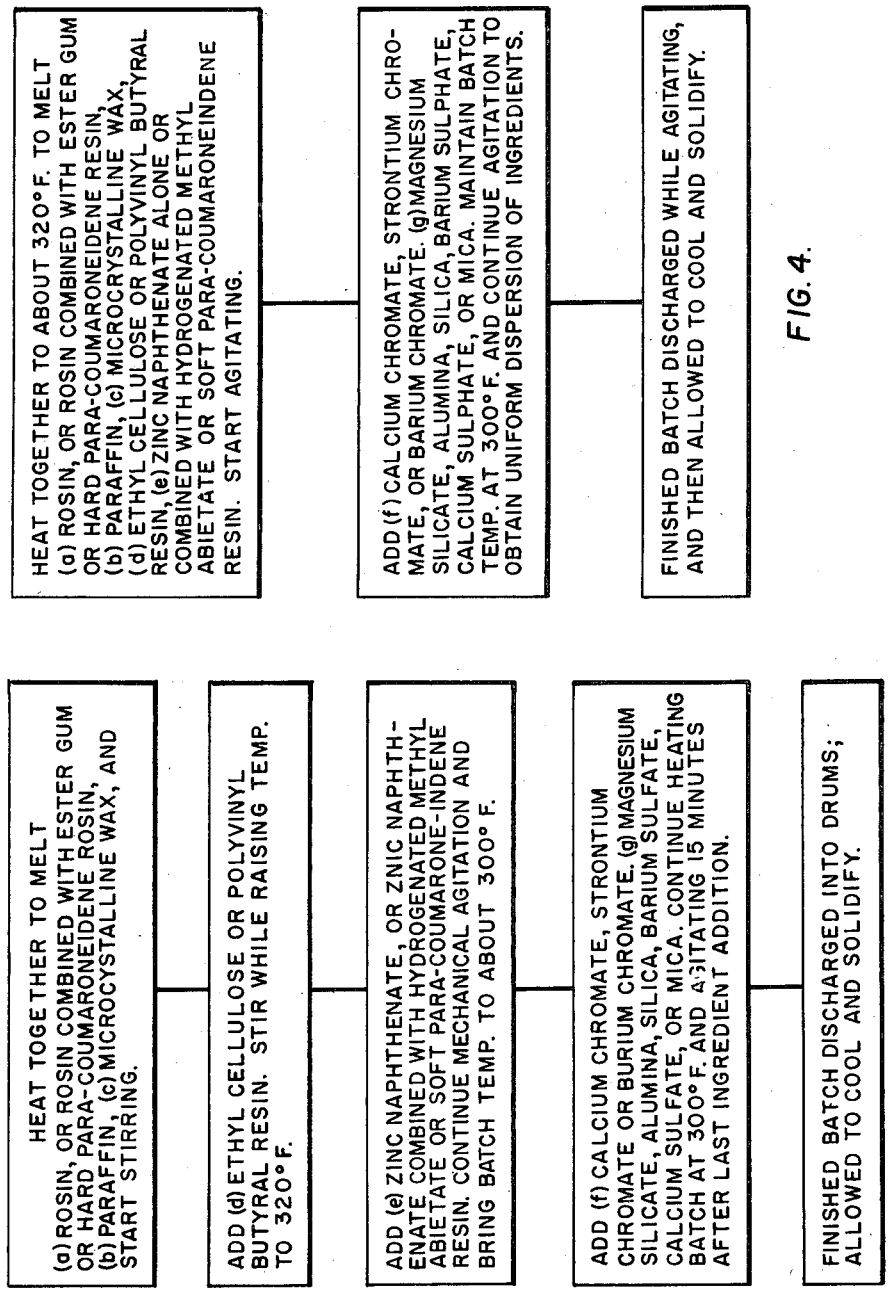

United States Patent Office 2,838,419
Patented June 10, 1958

2,838,419

NON-SOLVENT ANTI-CORROSIVE SHIPBOTTOM COMPOSITION

William J. Francis, Portsmouth, Va.

Application April 6, 1954, Serial No. 421,457

8 Claims. (Cl. 117—74)

(Granted under Title 35, U. S. Code (1952), sec. 266)

The invention described herein may be manufactured and used by or for the Government of the United States of America for governmental purposes without the payment of any royalties thereon or therefor.

This invention relates broadly to coating materials of the nature of paint and to a method of applying them; and more particularly this invention relates to an improved hot-melt anticorrosive coating material suitable for application to the surfaces of metal structures that are exposed under water for long periods of time, such as, for example, the bottoms of steel ships.

Anticorrosive paints are now commonly used for undercoating steel structures exposed under sea water, and are of a type that requires a solvent. Such solvent-containing anticorrosive paints are applied in successive coats, each coat being about two to three mils thick. In general, several hours or more are required for each coat to dry and harden before it is ready to receive the next overlying coat. The usual painting job requires a minimum of three to four coats in order to build up a coating or film that is sufficiently thick to economically provide an acceptable degree of protection to the underlying metal against corrosion by the action of weathering elements and sea water. Although such a painting job requires considerable time, it is relatively significantly permeable to sea water and absorbs water to an extent that results in early deterioration of the paint film. As a result, few painting jobs with solvent-containing anticorrosive paints retain satisfactory adhesion after exposure to repeated cycles of alternate sea water soakings and air and sun dryings. Accordingly, it is an object of the present invention to provide a coating composition that can be used on metal structures to provide a paint or coating thereon that lacks, to a large degree, the foregoing disadvantages of prior paints. To this end, the composition is in the form of a hot-melt or hot plastic composition that does not require a solvent for application so that substantially the entire composition can remain in the deposited film or coating. Reference may be made to U. S. Patent 2,579,610, dated December 25, 1951, for general information concerning hot-melt and other coatings.

A broad object of the invention is to provide that improved composition of a type described useful as a coating for shipbottoms, the interior of seawater ballast tanks, and similar steel structures that are exposed to water, the applied coating being highly anticorrosive and highly water impregnable.

An added feature of the invention resides in the fact that the anticorrosive coating can serve as a substrate for an antifouling paint for shipbottoms. The anticorrosive substrate coating can be top-coated with a hot plastic antifouling paint or a liquid paint such as a cold plastic antifouling paint or a vinyl-base antifouling paint. Additionally, the anticorrosive composition can be used as a coating on the interiors of submarine ballast tanks with or without a top coat of a non-antifouling paint.

A prime object of the invention is to provide a non-solvent-containing hot-melt composition of a type described which can be applied to a surface to provide a coating that has improved long-term durability under total sea-water immersion, and is more impermeable to and less absorptive of sea water than prior paints used for the same purposes.

Another object of the invention is to provide a hot-melt anticorrosive paint that can be applied in a single application as a thick layer or coat so that additional coats of the paint are not necessary. The one coat can be as much as ten to fourteen and more times the average thickness of the usual anticorrosive coat of solvent-containing paint. Consequently, more rapid paintings of shipbottoms are obtained by the elimination of the multiple coats required of prior anticorrosive paints and the drying time-intervals between such coats.

An object of the invention is to provide a hot-melt anticorrosive paint that protects steel surfaces by forming a thick barrier coating that mechanically discourages sea-water penetration through the coating; and also prevents corrosion of the metal, should the coating become mechanically damaged or broken in small spots, by its inhibiting or passivating action.

A further object of the invention is to provide a hot-melt anticorrosive coating composition that can be stored for long periods of time before use, that can easily be melted for use, that when melted has a low enough viscosity for spraying application, that can be applied in hot and in cold weather, that is stable in its molten condition for many hours, that provides exceptionally satisfactory coating of long life, and that has other features and advantages.

Still another object of the invention is to provide an anticorrosive coating of a type described which reverses the common process for painting ships' bottoms. In accordance with the invention, a relatively thick layer of the improved anticorrosive, protective composition is applied nearest the metal base to be protected and then covered with a thinner layer of toxic antifouling paint. This manner of application more effectively insulates the metal surfaces from the destructive and corrosive influences of copper or other metal-containing ingredients which are ordinarily put in antifouling paints for the antifouling purposes.

Another object of the invention is to provide a hot-melt composition that dries almost as fast as it is applied, changing from the liquid state to the solid state under the influence of a drop in temperature after application.

Still a further object of the invention is to provide a hot-melt coating composition of a type described that can be made economically from low cost domestic materials.

Other objects and many attendant advantages of the invention will be apparent from the following description and accompanying drawings, in which:

Fig. 1 is a flow chart of the steps which characterize a preferred process of the instant invention; and Figs. 2, 3 and 4 are flow charts of the steps which characterize alternate processes of the instant invention.

In general, a coating composition in accordance with the invention comprises a vehicle binder containing resin, wax and plasticizer blended with a chromate type pigment and an inert pigment. The chromate pigment is used for its inhibiting and passivating properties that discourage the corrosion of the underlying metal.

The quantities or percentages by weight of the component ingredients of a hot-melt anticorrosive coating composition embodying the invention may be as follows:

|                                                      | Percent Range  | Percent Preferred |
| ---------------------------------------------------- | -------------- | ----------------- |
| Rosin                                                | 50.0 to 57.5   | 52.97             |
| Paraffin (melting point range 125/127° F.)           | 11.8 to 16.2   | 12.66             |
| Microcrystalline wax (melting point range 170/195° F.) | 2.8 to 9.4   | 6.87              |
| Ethyl cellulose                                      | 1.6 to 1.9     | 1.74              |
| Zinc naphthenate, solid (approx. 12% zinc)           | 2.7 to 10.0    | 5.28              |
| Calcium chromate pigment                             | 10.0 to 25.0   | 12.66             |
| Magnesium silicate                                   | 0. to 15.0     | 7.82              |

In a manner of preparing the composition, the rosin and waxes are placed in a steam jacketed kettle and heated to approximately 300° F. until the ingredients are entirely melted. The ethyl cellulose is sprinkled into the molten material slowly with continual stirring and gradual raising of the temperature to about 320° F. This can be done in about 15 minutes. When the ethyl cellulose has melted, the zinc naphthenate is added; and the mixture or batch is stirred slowly and continuously while the temperature is brought to a value of about 300° F. The batch should be stirred until it is a homogeneous liquid at the desired temperature. This can be done in about 10 minutes. The calcium chromate and magnesium silicate are slowly sifted into the liquid batch while the mechanical agitation is maintained and the temperature kept at about 300° F. to insure adequate dispersion of all the ingredients. This usually takes at least 15 minutes after all the ingredients are in the kettle. The finished product is then discharged into drums and allowed to cool and solidify.

For use as a paint, the hot-melt composition is a resinous plastic which is solid at and below ordinary ambient temperatures and can be kept under ordinary paint-storage conditions indefinitely without detriment or deterioration.

The plastic solid softens at about 140° F. and becomes sufficiently liquid at temperatures between 250° F.–300° F. to apply by brushing or spraying.

For use, the plastic composition is broken into small chunks and brought up to a liquifying temperature. For example, it may be transferred to a melting kettle provided with a steam jacket for bringing the composition up in temperature. The preferred temperature range for application is from about 275° to 300° F. The liquid composition can be applied directly on and will adhere to a ship's steel hull and other metal surfaces. This means that it is a liquid of comparatively low viscosity when within the temperature range of application. In its molten state, the coating composition has a viscosity range of 34 to 100 centipoises at temperatures of 300° F. and 250° F., respectively.

In its molten state at 250° F.–300° F. for painting application, the composition is stable and non-reactive; and retains excellent heat stability at even higher temperatures as much as 310° F. and more. The molten composition can remain at 300° F. for periods as long as thirty hours without degradation and without embrittlement of the subsequently deposited film. The molten composition has satisfactory application characteristics at normal ambient air temperatures; and deposits a single film or coat of thicknesses up to the order of twenty mils that readily spreads smoothly and will not run, sag or flow from a vertical surface during painting or application even on a hot summer day. An important characteristic of the composition is that when it is applied to the hull surface of a ship or other base, it spreads readily to a smooth film which dries almost immediately after application, even under high humidity conditions such as occurs in the summertime. It can be applied even when the ambient surrounding air temperature is as low as 32° F.

The resulting application of a single thick film or coat of the new composition provides a protective coating that is exceptionally durable under total sea-water immersion exposure. Panel exposure tests have shown that the preferred composition gives excellent anticorrosive protection to immersed steel for at least five years.

The resulting coating is exceptionally resistant to penetration by sea water; a solid coating composition of twenty mils thickness having a penetration value of from .08 to .20 of a centimeter by the ASTM standard method D—5—25 using a standard ASTM needle No. 1—511 with a two hundred gram load for sixty seconds at 70° F. The applied coating is resistant to cracking and loss of adhesion. It will withstand bending; tests having shown complete adhesion at 77° F. to a steel base after 90° bending over a ½ inch diameter rod. The applied coating is also sag and run resistant on a vertical surface in air at temperatures as high as 140° F.

The new coating composition can be used as a thick durable anticorrosive substrate or undercoat nearest the metal surface of a ship, which can be topcoated with a relatively thinner coat of the more expensive antifouling paint. When initial service docking of the ship is required, renovating may be accomplished by renewing only the outer antifouling coating, thus obviating the need for removing the under film of anticorrosive composition which is more resistant to deterioration under sea exposure conditions.

The applied coating can be directly topcoated with Navy hot plastic antifouling paint or with liquid paints such as Navy cold plastic antifouling paint and vinyl base antifouling paint. Examples of the compositions of a Navy hot plastic antifouling paint are given in the aforesaid patent or the more recent Patent 2,602,752, dated July 8, 1952 of cold plastic antifouling paint in Military Standard MS 15431 (Ships) dated April 9, 1953; and of vinyl base antifouling paint in Military Specification MIL—P—15931A dated February 15, 1952.

The applied coating is of such enhanced durability that, when applied on a shipbottom as a single layer 20-mils-thick and top-coated with a thinner layer of antifouling paint, it withstood service conditions for the usual waterborne period of about 18 months without requiring more than a renewing of the antifouling topcoating. This is in direct contradiction to the usual practice of removing the whole paint system from the shipbottom and recoating with both the anticorrosive and the antifouling paints.

The purpose of the various ingredients seem to be as follows:

Rosin serves as the main resinous binder ingredient of the matrix.

Paraffin acts as a plasticizer for the resin; reduces the viscosity of the molten composition sufficiently to make it easily sprayable for application by spray gun.

Microcrystalline wax enhances the sag or flow resistance properties of the applied coating film, i. e., it helps to prevent sagging or flowing of the coating applied to vertical surfaces under hot climatic conditions or when the coating is subjected to the direct rays of the sun.

Ethyl cellulose serves as a polymeric toughening ingredient to impart cracking resistance properties to the deposited film.

Zinc naphthenate is an auxiliary plasticizer for the rosin; serves as a coupling agent to help bind the other ingredients together into a more homogeneous mixture; improves the distensibility properties and adhesion characteristics of the coating film.

Calcium chromate is the primary inhibitive pigment for inhibiting corrosion of the metal substrate.

Magnesium silicate serves as the inert extender pigment to dilute the primary pigment and facilitate better suspension of the total pigment in the molten composition; helps to build film thickness and strengthens the film; imparts "tooth" and reduces the gloss in the deposited film to provide better anchorage for subsequently applied top coat of paint.

It is to be observed that the new anticorrosive composition contains a chromate inhibiting or passivating pigment which is rarely, if ever, used as a pigment ingredient of non-solvent-containing hot-melt anticorrosive paint. It is also believed that the use of calcium chromate in the subject composition is unique because the use of the more orthodox inhibitive pigments, such as, for example, zinc chromate, is not successful in this type of composition.

It has been found that ester gum or hard para-coumarone-indene resin can be substituted for as much as 50 percent of the rosin. Polyvinyl butyral resin can be used in place of the ethyl cellulose.

It has also been found that strontium chromate or barium chromate pigment may be used in place of the calcium chromate pigment; and other inert pigments such as alumina, silica, barium or calcium sulphate, and mica can replace the magnesium silicate.

It has also been found that hydrogenated methyl abietate, soft para-coumarone-indene resin (with a melting range from 86° F. to 104° F.) or blown fish oil may partially replace the zinc naphthenate up to 50 percent.

The foregoing substitutions can be made without noticeably changing the physical qualities of the composition or coating for durable anticorrosive protection and use.

While only certain forms of the present invention have been described herein, it will be apparent that many changes and equivalents thereof are possible without departing from the spirit thereof, and it is intended to cover all such modifications as fall within the scope of the equivalents of the appended claims.

What is claimed is:

1. An anti-corrosive coating composition made up from ingredients listed below in substantially the listed range of percentages, by weight:

| | Percent range |
|---|---|
| (a) Rosin | 50.–57.5 |
| (b) Paraffin (melting point 125–127° F.) | 11.8–16.2 |
| (c) Microcrystalline wax (melting point range 170–195° F.) | 2.8–9.4 |
| (d) Ethyl cellulose | 1.6–1.9 |
| (e) Zinc naphthenate, solid (about twelve percent zinc) | 2.7–10. |
| (f) Calcium chromate | 10.–25. |
| (g) Magnesium silicate | 0.–15. |

2. A hot-melt non-solvent anti-corrosive coating composition made up from ingredients listed below in substantially the listed percentages by weight:

| | Percent |
|---|---|
| (a) Rosin | 52.97 |
| (b) Paraffin (melting point 125–127° F.) | 12.66 |
| (c) Microcrystalline wax (melting point range 170–195° F.) | 6.87 |
| (d) Ethyl cellulose | 1.74 |
| (e) Zinc naphthenate, solid (approx. twelve percent zinc) | 5.28 |
| (f) Calcium chromate pigment | 12.66 |
| (g) Magnesium silicate | 7.82 |

3. An anti-corrosive coating composition of a type described made up from ingredients listed below in substantially the listed range of percentages by weight:

| | Percent range |
|---|---|
| (a) A substance from the class consisting of rosin, or rosin combined with ester gum or hard para-coumarone-indene resin with rosin constituting at least 50% of the resin combination | 50.–57.5 |
| (b) Paraffin (melting point 125–127° F.) | 11.8–16.2 |
| (c) Microcrystalline wax | 2.8–9.4 |
| (d) A substance from the class consisting of ethyl cellulose and polyvinyl butyral resin | 1.6–1.9 |
| (e) A substance from the class consisting of zinc naphthenate, or zinc naphthenate combined with hydrogenated methyl abietate, or soft para-coumarone-indene resin (melting range 86–104° F.) with the zinc naphthenate constituting at least 50% of such combination | 2.7–10. |
| (f) A substance from the class consisting of calcium chromate, strontium chromate, and barium chromate | 10.–25. |
| (g) A substance from the class consisting of magnesium silicate, alumina, silica, barium sulphate, calcium sulphate and mica | 0.–15. |

4. A method of painting steel structures that are to be exposed under water for long periods of time, comprising applying directly to the steel of the structure an anti-corrosive substrate coating in a molten state, the coating composition being solid at ambient temperatures, but molten in a temperature range of about 250°–300° F. and above, said coating having a formulation substantially as follows:

| | Percent range |
|---|---|
| (a) A substance from the class consisting of rosin, ester gum and hard para-coumarone-indene resin | 25.–32.5 |
| (b) Paraffin (melting point 125–127° F.) | 11.8–16.2 |
| (c) Microcrystalline wax | 2.8–9.4 |
| (d) A substance from the class consisting of ethyl cellulose and polyvinyl butyral resin | 1.6–1.9 |
| (e) A substance from the class consisting of zinc naphthenate, hydrogenated methyl abietate, soft para-coumarone-indene resin (melting range 86°–104° F.) | 1.35–5. |
| (f) A substance from the class consisting of calcium chromate, stontium chromate, and barium chromate | 10.–25. |
| (g) A substance from the class consisting of magnesium silicate, alumina, silica, barium sulphate, calcium sulphate and mica | 0.–15. |
| (h) Rosin | 25.–32.5 |
| (i) Zinc naphthenate | 1.35–5. | and subsequently applying an anti-fouling coating.

5. A method of compounding a hot-melt anti-corrosive composition having a formulation comprising:

| | Percent range |
|---|---|
| (a) Rosin | 50.–57.5 |
| (b) Paraffin (melting point 125–127° F.) | 11.8–16.2 |
| (c) Microcrystalline wax (melting point range 170–195° F.) | 2.8–9.4 |
| (d) Ethyl cellulose | 1.6–1.9 |
| (e) Zinc naphthenate, solid (about twelve percent zinc) | 2.7–10. |
| (f) Calcium chromate | 10.–25. |
| (g) Magnesium silicate | 0.–15. | said method comprising heating ingredients (a), (b) and (c) so that they are melted, adding ingredient (d) to the melt, raising the temperature to about 320° F., adding ingredient (e) and bringing the melt to a temperature of about 300° F., and mechanically agitating the melt and slowly adding ingredients (f) and (g).

6. A method of compounding a hot-melt anti-corrosive composition having a formulation comprising

| | Percent range |
|---|---|
| (a) Rosin | 50.–57.5 |
| (b) Paraffin (melting point 125–127° F.) | 11.8–16.2 |
| (c) Microcrystalline wax (melting point range 170–195° F.) | 2.8–9.4 |
| (d) Ethyl cellulose | 1.6–1.9 |
| (e) Zinc naphthenate, solid (about twelve percent zinc) | 2.7–10. |
| (f) Calcium chromate | 10.–25. |
| (g) Magnesium silicate | 0.–15. | said method comprising melting ingredients (a), (b), (c), (d) and (e) into a liquid at about 300° F., adding ingredients (f) and (g) to the liquid and for at least about fifteen minutes keeping the temperature of the liquid at about 300° F. and stirring to insure adequate dispersion of the ingredients in the liquid.

7. A method of compounding a hot-melt anti-corrosive composition having a formulation comprising

|   | Percent range |
|---|---|
| (a) A substance from the class consisting of rosin, ester gum and hard para-coumarone-indene resin | 25.–32.5 |
| (b) Paraffin (melting point 125–127° F.) | 11.8–16.2 |
| (c) Microcrystalline wax | 2.8–9.4 |
| (d) A substance from the class consisting of ethyl cellulose and polyvinyl butyral resin | 1.6–1.9 |
| (e) A substance from the class consisting of zinc naphthenate, hydrogenated methyl abietate, soft para-coumarone-indene resin (melting range 86°–104° F.) | 1.35–5. |
| (f) A substance from the class consisting of calcium chromate, strontium chromate, and barium chromate | 10.–25. |
| (g) A substance from the class consisting of magnesium silicate, alumina, silica, barium sulphate, calcium sulphate and mica | 0.–15. |
| (h) Rosin | 25.–32.5 |
| (i) Zinc naphthenate | 1.35–5. | said method comprising heating ingredients (a), (b), (c) and (h) so that they are melted, adding ingredient (d) to the melt, raising the temperature to about 320° F., adding ingredients (e) and (i), and bringing the melt to a temperature of about 300° F., and mechanically agitating the melt and slowly adding ingredients (f) and (g).

8. A method of compounding a hot-melt anti-corrosive composition having a formulation comprising

|   | Percent range |
|---|---|
| (a) A substance from the class consisting of rosin, ester gum and hard para-coumarone-indene resin | 25.–32.5 |
| (b) Paraffin (melting point 125–127° F.) | 11.8–16.2 |
| (c) Microcrystalline wax | 2.8–9.4 |
| (d) A substance from the class consisting of ethyl cellulose and polyvinyl butyral resin | 1.6–1.9 |
| (e) A substance from the class consisting of zinc naphthenate, hydrogenated methyl abietate, soft para-coumarone-indene resin (melting range 86°–104° F.) | 1.35–5. |
| (f) A substance from the class consisting of calcium chromate, strontium chromate, and barium chromate | 10.–25. |
| (g) A substance from the class consisting of magnesium silicate, alumina, silica, barium sulphate, calcium sulphate and mica | 0.–15. |
| (h) Rosin | 25.–32.5 |
| (i) Zinc naphthenate | 1.35–5. | said method comprising melting ingredients (a), (b), (c), (d), (e), (h) and (i) into a liquid at about 300° F., adding ingredients (f) and (g) to the liquid and keeping the temperature of the liquid at about 300° F. and stirring for a time to obtain adequate dispersion of the ingredients in the liquid.

References Cited in the file of this patent

UNITED STATES PATENTS

| 1,147,971 | Perry | July 27, 1915 |
| 2,138,578 | Hershberger | Nov. 29, 1938 |
| 2,394,101 | Phillips et al. | Feb. 5, 1946 |
| 2,430,589 | Sloan | Nov. 11, 1947 |
| 2,434,291 | Smith | Jan. 13, 1948 |
| 2,602,752 | Francis | July 8, 1952 |

OTHER REFERENCES

Jackson: A Review of Ship Bottom Paints, The Paint Industry Magazine—December 1942, pp. 412, 414.